United States Patent [19]

Pfeffer

[11] 4,288,272

[45] Sep. 8, 1981

[54] LABEL APPLICATOR WITH SENSOR

[75] Inventor: George B. Pfeffer, Minnetonka, Minn.

[73] Assignee: Datafile Limited, Willowdale, Canada

[21] Appl. No.: 43,821

[22] Filed: Jun. 4, 1979

[51] Int. Cl.[3] .......................... B65H 5/28; G01N 21/86

[52] U.S. Cl. .......................... 156/361; 156/542; 156/584; 221/73; 250/227; 250/571

[58] Field of Search .......................... 156/540-542, 156/361, 584; 250/227, 571, 223 R, 338; 350/96.21-96.22, 96.20; 221/73

[56] References Cited

U.S. PATENT DOCUMENTS

| | | | |
|---|---|---|---|
| 3,566,083 | 2/1971 | McMillin | 250/227 |
| 4,048,494 | 9/1977 | Liesting | 226/24 X |
| 4,123,310 | 10/1978 | Varon et al. | 156/361 X |
| 4,167,304 | 9/1979 | Gelbke | 350/96.21 |

*Primary Examiner*—David A. Simmons

[57] ABSTRACT

A label sensor adapted for use with a labeller comprises an emitter, a receiver and a fibre optic bundle for transmitting an emitted beam to the receiver. The labeller is of the type which separates spaced-apart labels from a carrier by passing the carrier around the free end of a label splitter tongue member. An end of the fibre optic bundle is positioned in an opening of the splitter tongue near its free end to detect the leading portion of a label as the carrier passes over the bundle end. The use of a fibre optic bundle and its manner of mounting in the tapered end permits the positioning of the relatively bulky emitter or receiver remote of the compact free end of the splitter tongue member and provides a precise label sensing.

14 Claims, 9 Drawing Figures

FIG.7.
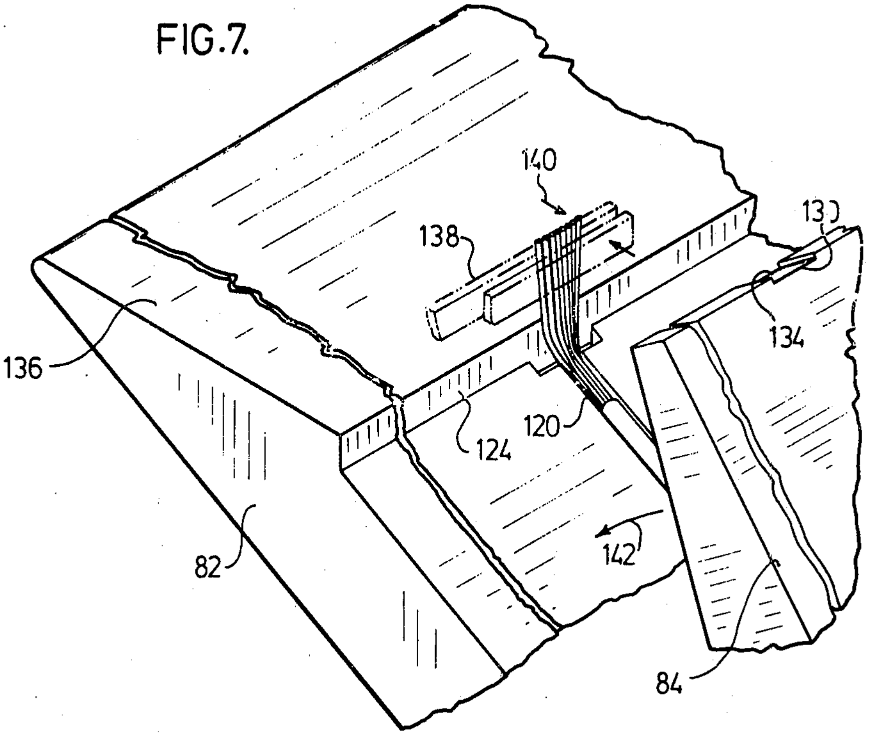
FIG.8.
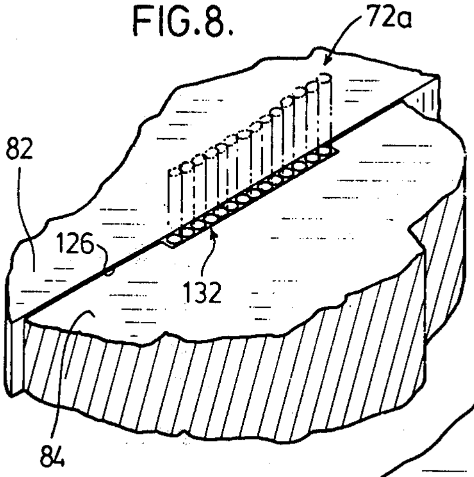
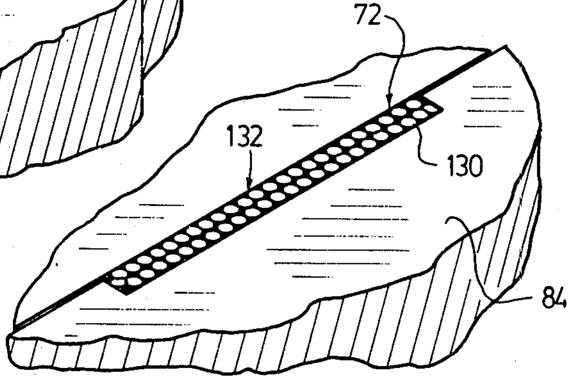
FIG.9.

LABEL APPLICATOR WITH SENSOR

FIELD OF THE INVENTION

This invention relates to labellers, particularly those for separating spaced-apart labels from a carrier and applying the labels to articles.

BACKGROUND OF THE INVENTION

There is widespread use of automatic labelling devices for applying self-adhesive labels of the pressure-sensitive type on a great variety of articles. The labels may be preprinted or printed just prior to application of labels to articles. The self-adhesive pressure-sensitive type of label is usually provided in supply form by locating the labels in a spaced-apart manner on a backing or carrier web. The web is pretreated to ensure ease of separation of label from the backing paper. To provide the supply of labels for the labelling device, such labels as they adhere to the backing are in the form of a roll which may be placed on a supply reel.

An example of an automatic labelling device using such supply of labels is that manufactured by Accraply Systems, a division of Elcono Corporation of Minneapolis, Minn., and sold under the trademark ACCRAPLY. That device applies self-adhesive labels to articles as they are conveyed past the labeller. In that instance, the label is dispensed by passing the carrier web with labels along a ramp sloped relative to the surface to which a label will be applied and pulling the carrier web around the free end of the ramp or splitter tongue to separate the label from the web. This separation is due to the label being stiffer than the carrier web and the optional presence of release agents on the carrier web. The separated label is then applied to an article.

A system has been developed to apply labels to file folders, where a plurality of automatic labellers apply labels at predetermined locations on a file. The system is described in co-pending U.S. patent application Ser. No. 830,118 now U.S. Pat. No. 4,103,779 and Canadian patent application Ser. No. 291,224.

For reasons more fully explained in co-pending United States application Ser. No. 17,966, it is desirable to determine the position of the label which is about to be applied so that missing labels, inconsistent spacing between labels on the carrier web or varying lengths of labels create no problem in the labelling operation. Approaches have been made in the past to sense label position in this manner, such as disclosed in U.S. Pat. No. 3,801,408. Although not specifically defined in that patent, it is presumed that the label sensor operates on the basis of light reflectivity to determine the presence of a label. It is apparent that other approaches include the use of laser scanning device to read marks on a label to determine label position. The provision of marks on the label requires additional steps in printing of the label; therefore, adding to its cost. Should the marks be faulty, there is the resultant inaccuracy in label detection.

It is, therefore, desirable to provide a label sensor which is abosolute in detecting the presence of a label to increase accuracy in the labelling operation. To accomplish this by working within the confines of the compact label splitter tongue of the type which is used to separate labels from carrier web has been a significant problem.

It is, therefore, an object of this invention to provide a label sensor device for labelling apparatus which is capable of accurately determining label presence, at least for a label next to be separated from the web in a compact, easy to manufacture, reliable manner.

SUMMARY OF THE INVENTION

The label sensor, according to this invention, is adapted for use with the above-described type of labellers. The labels to be applied may be of the pressure-sensitive type which are spaced-apart on a carrier web. The label sensor comprises components such as an emitter unit and a receiver unit. A splitter tongue having a free end is used to separate labels from web. The splitter tongue has an aperture or opening defined therein to receive an end of a fibre optic bundle. Either the emitter or receiver is spaced-apart from and directed on the end of the fibre optic bundle. Located remotely of the free end of the splitter tongue is the other unit of the sensor, because of its relative bulky size, thereby maintaining a compact splitter tongue arrangement. The fibre optic bundle is located in the splitter tongue to operatively associate the units in detecting labels. The web travels over the aperture in the splitter tongue where the web passes a detectable level of emitted beam intensity and the label and web pass a significantly less or zero level of beam intensity.

The emitter may emit various forms of electromagnetic radiation such as infrared radiation or visible light. Infrared radiation is preferable in that changes in the ambient light will not affect the operation of sensor units.

The receiver output is monitored and a signal is generated upon a predetermined decrease in level of beam intensity to indicate a position on the splitter tongue of at least the leading portion of a label as it overlies a portion of the fibre optic bundle end.

The fibre optic bundle is positioned in the aperture where the aperture may be formed in a manner to confine and shape the bundle end into a desired shape to suit the function of the label sensor. Precision in detecting a label leading edge and thereby determining its position within 1 or 2 thousands of an inch can now be realized with this particular arrangement for the fibre optic bundle end.

DESCRIPTION OF THE DRAWINGS

Preferred embodiments of the invention are shown in the drawings wherein:

FIG. 7 demonstrates a technique in locating the fibre optic bundle end;

FIG. 8 shows the fibre optic bundle in position and cemented in place;

FIG. 9 shows the fibre optic bundle end in final form ready for use in the labelling apparatus.

DETAILED DESCRIPTION OF THE PREFERRED EMBODIMENTS OF THE INVENTION

Figure 1:
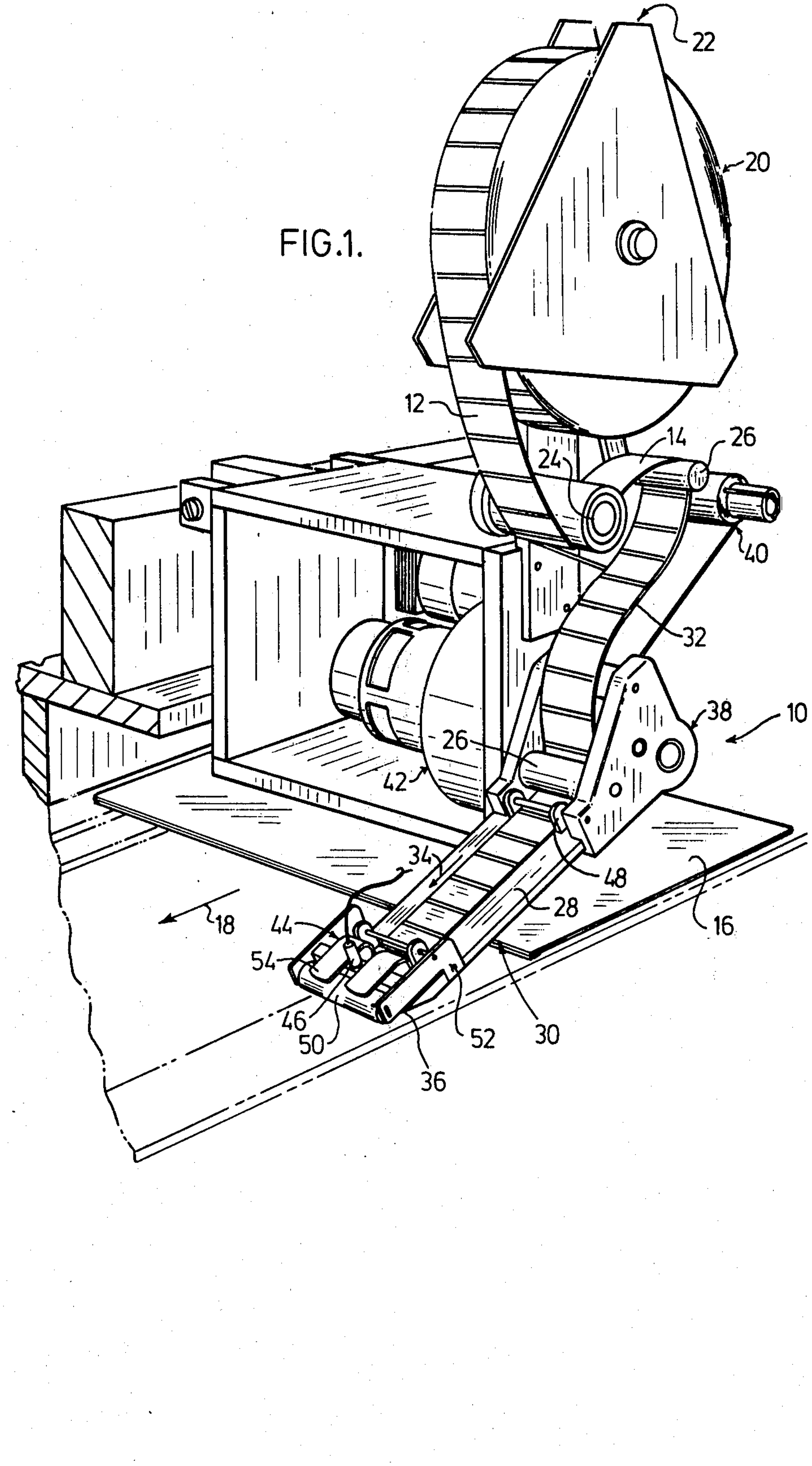
FIG. 1 is a perspective showing a labeller incorporating a preferred embodiment for the label sensor according to this invention.

A labelling apparatus 10 is shown in FIG. 1 of the drawings. In the particular use for the labeller, it applies labels 12, as carried on a web 14, to an article 16 such as a file folder. The file folder 16 is conveyed in the direction of arrow 18 under the labeller 10. The labeller may be controlled by a computer to synchronize the application of a desired label to a particular location on the edge of a file folder 16. A more detailed discussion of this aspect of labelling articles is in co-pending U.S. applications Ser. Nos. 830,118 and 17,966.

In this embodiment, the labels on the carrier web are supplied in the form of a roll 20 which is mounted on a supply reel 22. The carrier web 14 is trained around rollers 24 and 26 so as to place the carrier web onto the ramp upper surface 28 of the splitter tongue device 30. The operation of the rollers 24 and 26, assure an untensioned looped supply in the area 32 for the labeller. The carrier web 14 with labels travels downwardly along the ramp upper surface 28 in the direction of arrow 34 and around the free end 36 of the splitter tongue 30. The web travels rearwardly under the ramp 28 to a drive capstan generally designated 38 which pulls the web around the splitter tongue 36. Excess web exiting from the drive capstan 38 is taken up by discarded web spooler 40.

The capstan 38 is driven by drive generally shown at 42. This drive may be of the type including a particle clutch and brake arrangement for controlling the capstan feed, as described in co-pending U.S. application Ser. No. 17,966, or may be of the servo motor type. The operation of the drive 42 is such to cause the capstan 38 to draw web around the free end of the splitter tongue to apply a label to the folder 16 in a timed manner so as to locate the label at a desired position on the folder. This, of course, may be controlled by a computer in that the movement of the folder may be sensed and the operation of the capstan timed such that a label is separated from the web and is contacted at a desired spot on a conveyed folder.

To accomplish precise labelling, it is important to determine the label position, so that timing of the movement of the web is such that the label travels through a known distance in the correct time to contact the continuously conveyed folder at the proper location. To accomplish this, a label sensor device in this embodiment is provided near the free end 36 of the splitter tongue, as shown in FIG. 1. The label sensor is generally designated 44.

To ensure a lateral positioning of the web and labels on the ramp surface 28, web guide devices 48 are provided which may be manually actuable to locate the web in the desired position as it moves around the free end of the splitter tongue.

A roller 50 is mounted on support member 52. It is resiliently urged towards the conveyor bed by springs 54 to thereby apply the moving, separated, pressure-sensitive label onto the folder as it is conveyed thereby.

Figure 2:
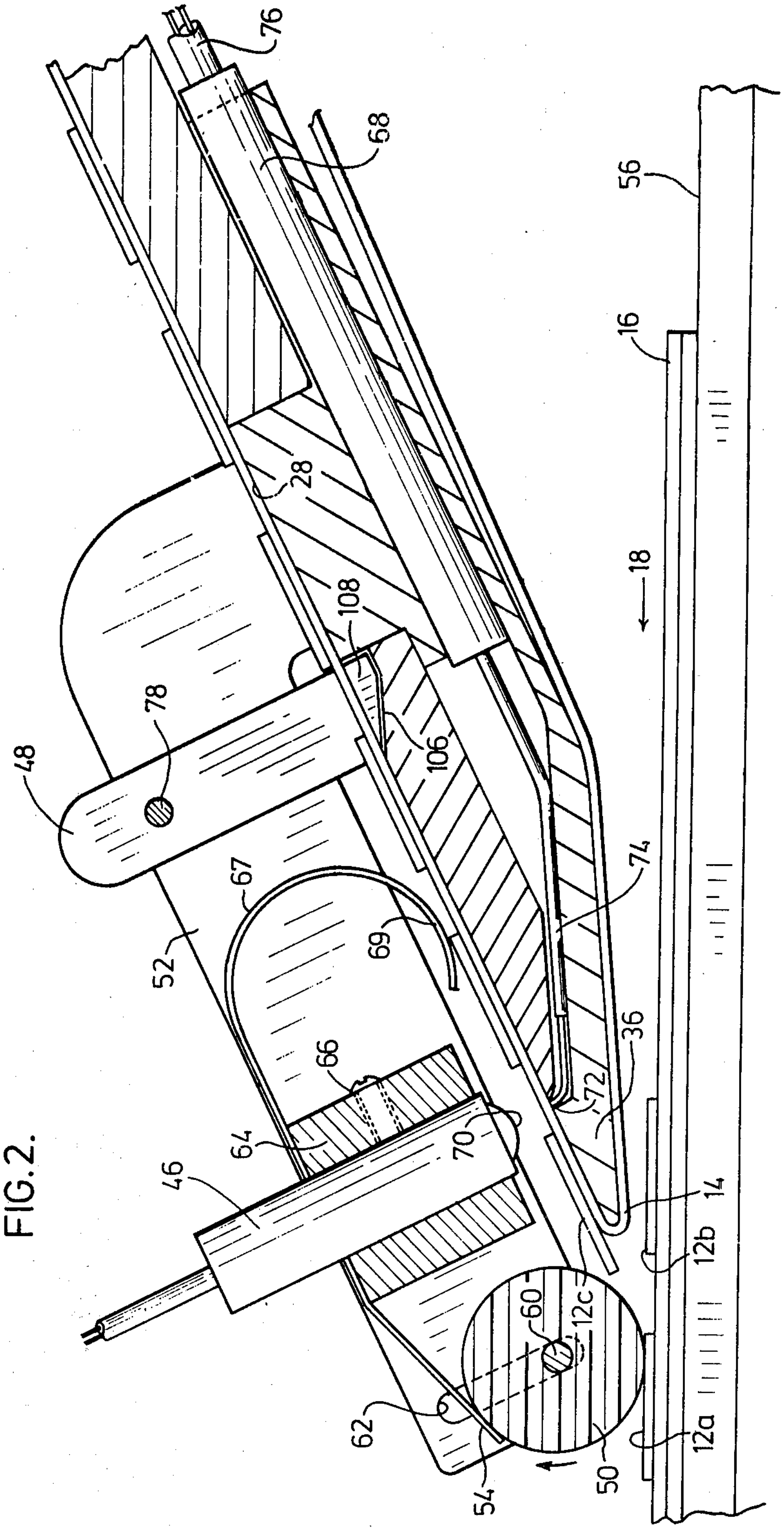
FIG. 2 is an elevation of a portion of the splitter tongue arrangement and label sensor device mounted thereon for the labeller of FIG. 1.

Turning to FIG. 2, the file folder 16 is conveyed in the direction of arrow 18 on the conveyor bed 56. As shown, the label application roller 50 is contacting the surface of the folder and, in this instance, is touching an already applied label 12*a* which may have been applied by a preceding labeller. The contact of the resilient spring 54 is on the upper surface of the roller to urge it towards the conveyor bed where the mounting pins 60 for the rollers are movable up and down in elongated slots 62, defined in the support member 52. This arrangement permits the roller to accommodate variations in folder thickness.

A label 12*c*, which has its leading portion separated from the web, is in readiness for application to the conveyed folder. The label 12*c* is to be applied rearwardly of the label 12*b*. The timing of the labelling operations is such that movement of the web causes the label 12*c* to move towards and at the same linear speed as the conveyed folder 16, so that is contacts the folder under application roller 50 in the desired location. As the folder continues to move, the roller 50 completes the application of label to folder as the label leaves the moving web. In order to place label 12*c* in readiness for application, the label sensor in this instance detects the leading portion of the label and then the controller for determining capstan drive continues movement of the web until the label is in the position shown. Therefore, the sensor provides a starting point or base line in determining label position, so that the run-on or delay in stopping web movement may be precisely timed out to position the label about to be applied with the desired amount of overhang beyond the splitter tongue free end.

The sensing of the leading edge of label 12*c* is accomplished in this particular embodiment by the use of an emitter unit 46, secured to a bridge 64 which has set screw 66 to secure the emitter 46 at the desired height above the ramp surface 28. A receiver unit 68 is positioned remotely of the free end 36 of the splitter tongue. The receiver 68 is tuned to detect the particular form of electromagnetic radiation emitted from unit 46. The emitter 46 has a lense 70 which directs a beam of electromagnetic radiation downwardly onto an end 72 of the fibre optic bundle 74. The fibre optic bundle 74 transmits the received beam to the receiver unit 68.

This type of detector is desirable due to its reliability and absoluteness in detecting a label. The unit does not require any additional printing on the label as is required in the use of light reflective type sensors or laser scanners. Instead, the label detector 44 operates on the basis of the beam passing through the web material 14, to provide a level of beam intensity for the receiver 68. This, in turn, sets the highest level of radiation to be received during operation of the labeller. Once a label passes between the emitter and receiver to block off at least a portion of the beam, the intensity of the beam is decreased. The receiver 68, therefore, has a correspondingly reduced output in cable 76 which leads to the label sensor module. The module, in turn, transmits a signal to the computer to indicate that a label is sensed, or more precisely, that the leading portion of label is moving over the end of the fibre optic bundle 74.

A preferred type of label sensor is that sold by Banner Engineering Corporation which uses an infrared modulated beam pulsed at approximately 20 kHz. The receiver is tuned to sense only the beamed infrared radiation so that ambient light has little or no influence on the operation of the label sensor. The decreased output of the receiver 68, due to label presence, may cause the control module to generate a spike signal or the like which signals the labeller controller, so that the label may be positioned in readiness for labelling.

The significant difficulty in using this type of label sensor is that the relative bulkiness of the emitter and receiver compared to the size of the splitter tongue free end 36 prohibited its installation. According to this invention, this problem has been overcome by using a fibre optic bundle 74 which transmits the beam received from the emitter and curves the beam rearwardly to the receiver 68 which, in this embodiment, has to detect in a field having an axis which is 90° to the axis of the beam from emitter 46. This fibre optic bundle, therefore, permits the positioning of the relatively bulky receiver 68 remote from the splitter tongue 36 to now provide precision in determining the leading edge of a label in this instance next to be applied.

To ensure that the web 14 is taut as it travels over the fibre optic bundle end to thereby ensure that label position does not vary as it moves past the detector, spring fingers are secured to the bridge 64 and extend downwardly to contact the supply of labels. These springs are a continuation of springs 54 and are in the form of looped portions 67 where their base portion 69 contacts the labels in the manner shown to provide tension on the web, so that it is taut as it travels between the detector components. Due to the configuration of the spring fingers, they exert a force on the travelling web in a direction opposite to its travel of arrow 34.

Figure 3:
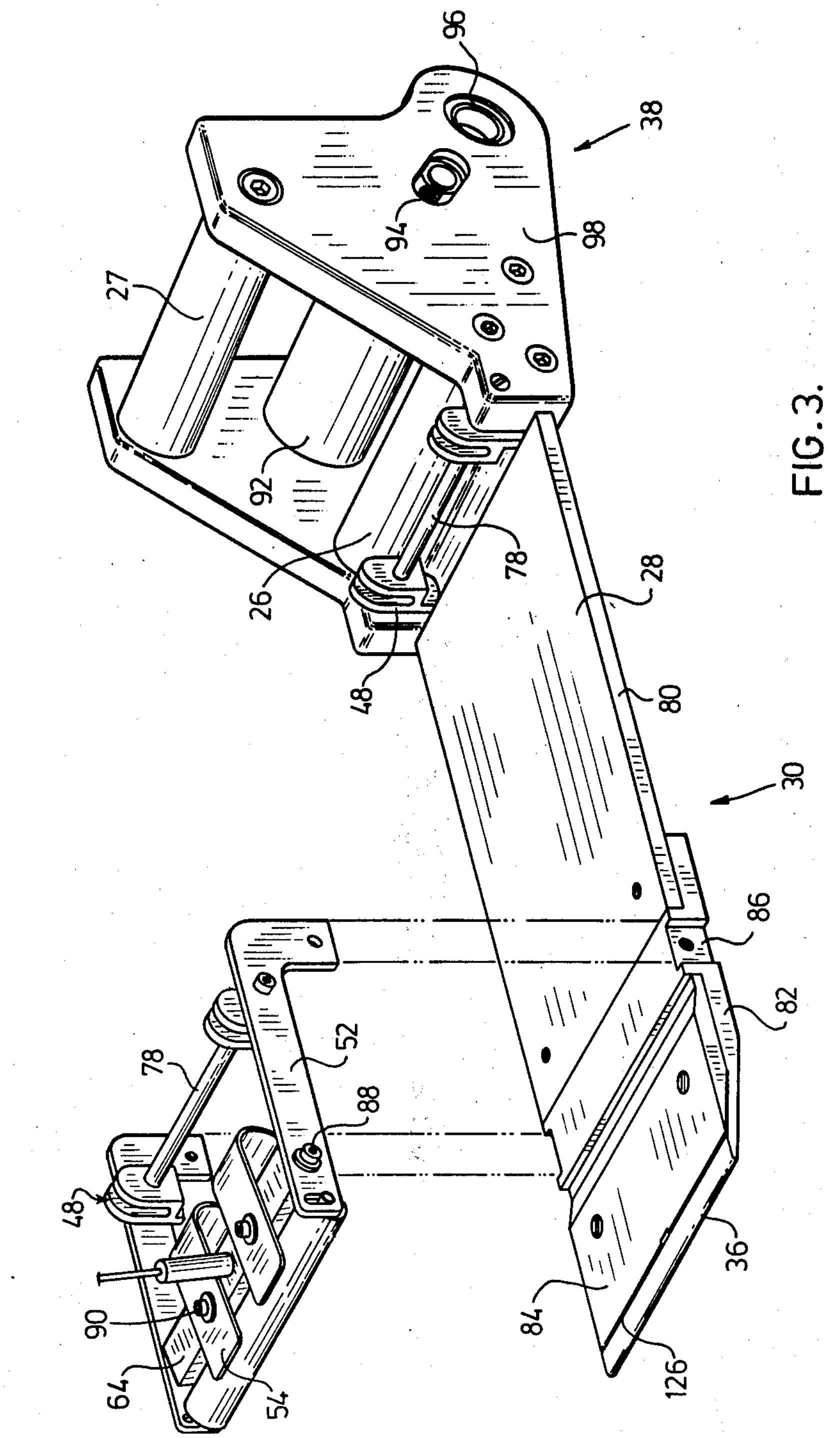
FIG. 3 shows in perspective the splitter tongue with the label applicator and support therefor spaced above the splitter tongue.

Further details of the splitter tongue 30 are shown in FIG. 3. The web travels over roller 27 and beneath roller 26 to position it on the upper surface of ramp 28. The finger actuable guides 48 are movable along rod 78 to adjust to the varying widths of web which may carry the label. A corresponding finger actuable adjustment device 48, mounted to support 52, is positioned above the ramp 28 and moves along rod 78. The splitter tongue arrangement is made up of support portion 80 which has secured to its underside a tongue free end or wedge-shaped base portion 82 which presents the splitter tongue free end 36. Overlying the base 82 is a removable plate 84. The supports 52 are secured to the sides of base 82 in recesses 86. The bridge member 64 is shown as secured to the support 52 by bolts 88. The spring devices 54 are secured by Allen screws 90. The capstan drive 38 has a nip roller 92 which is spring biased by springs 94 against a rubber covered capstan roller, not shown, but having an axle 96 in the frame plate 98 of the capstan drive. The web is fed between the capstan roller and nip roller 92 to provide positive engagement with the captan roller which is, in turn, driven by the drive mechanism 42.

The capstan roller may be vulcanized with an 80 Durometer Nordel (trademark) rubber. The nip roller may be vulcanized with a softer rubber such as 70 Durometer Nordel. The softer rubber for the nip roller ensures that the outer dimension for the capstan roller remains dimensionally stable, because any variation in label thickness will be accommodated by distorting the softer nip roller. Therefore, accuracy in labelling is maintained by providing a constant diameter for the capstan roller which controls the label placement.

Figure 4:
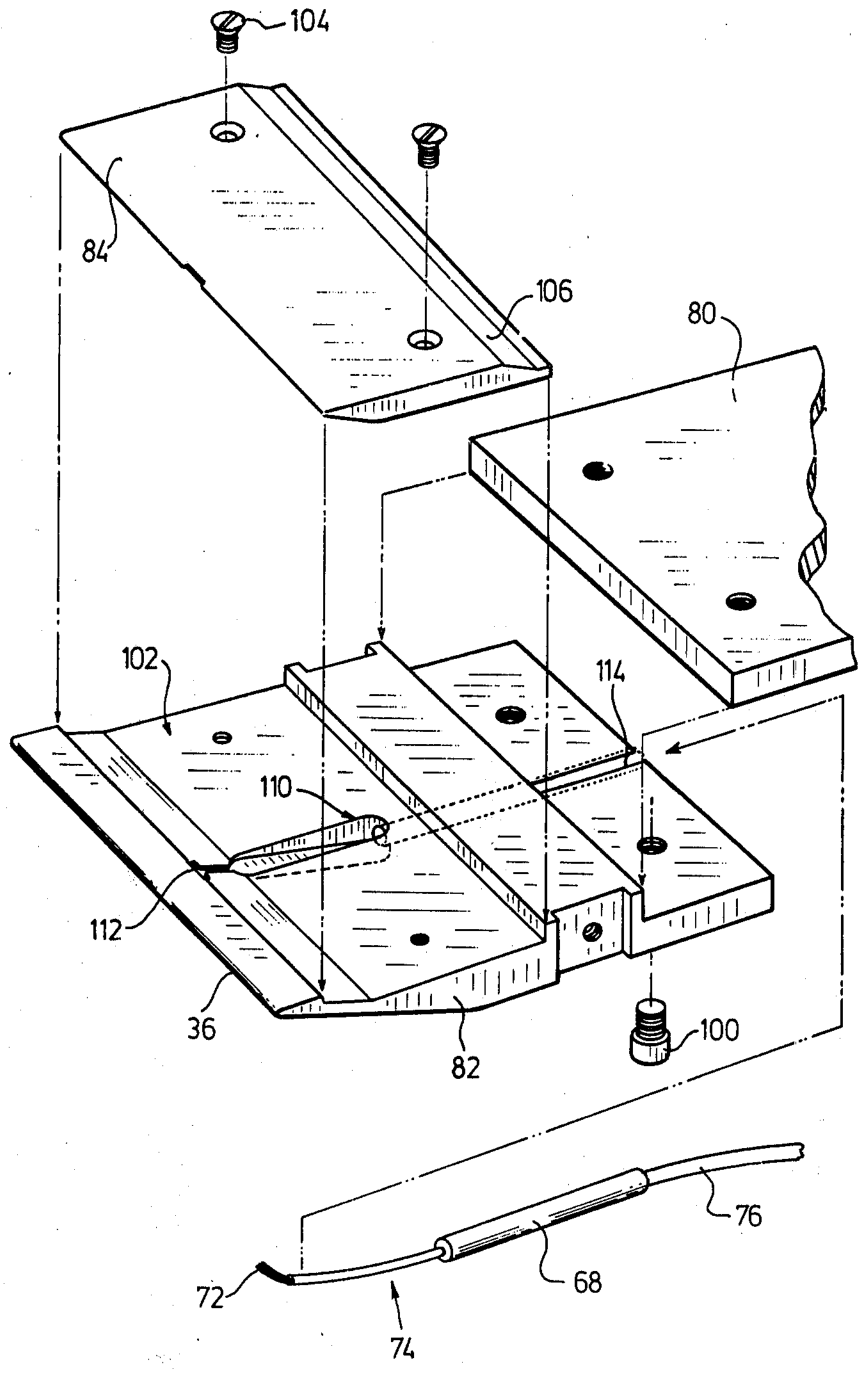
FIG. 4 is an exploded view of the splitter tongue arrangement with fibre optic bundle.

An exploded view of the splitter tongue free end arrangement is shown in more detail in FIG. 4. As can be seen, the base 82 is secured to the underside of the support 80 by screws 100. The removable plate 84 is positioned in the recess bed 102 of the base and secured by screws 104. The rear portion of plate 84 has a rearwardly slopped portion 106 to define a recess in the splitter tongue which, as shown in FIG. 2, receives the depending end 108 of the finger guides 48. This prevents the web from jumping under and outside of the guide fingers 48.

A tunnel generally designated 110 is formed in the splitter tongue when the base 82 is secured to the support 80 and the plate 84 is secured to the base. This tunnel leads from an opening at 112 rearwardly of the free end 36 of the splitter tongue to the rear 114 of the base 82. The fibre optic bundle 74 has its end 72 extending upwardly at the opening 112 and extends along the tunnel 110 where the receiver portion 68 is within the tunnel and emerges from the rear portion of the tunnel 114 in the manner shown in FIG. 2, where lead 76 is connected to the label sensor module.

Figure 5:
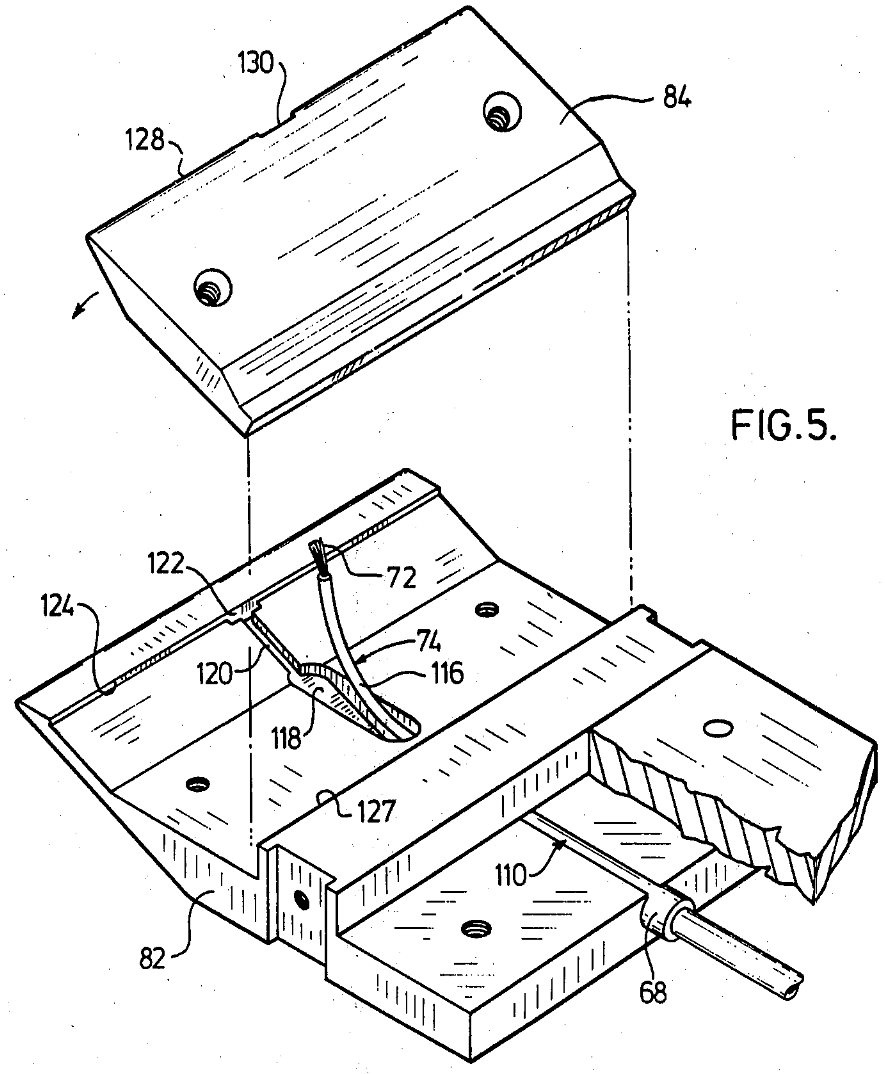
FIG. 5 is an exploded view with the fibre optic bundle being positioned within the splitter tongue.

As shown in FIG. 5, the receiver portion 68 of the label detector is positioned in the tunnel 110. The fibre optic bundle 74, sheathed in coating 116, lies in the portion of tunnel 110 defined by elongate-shaped recessed area 118 leading into a narrow channel 120 which flares outwardly in the form of recess portion 122.

Figure 6:
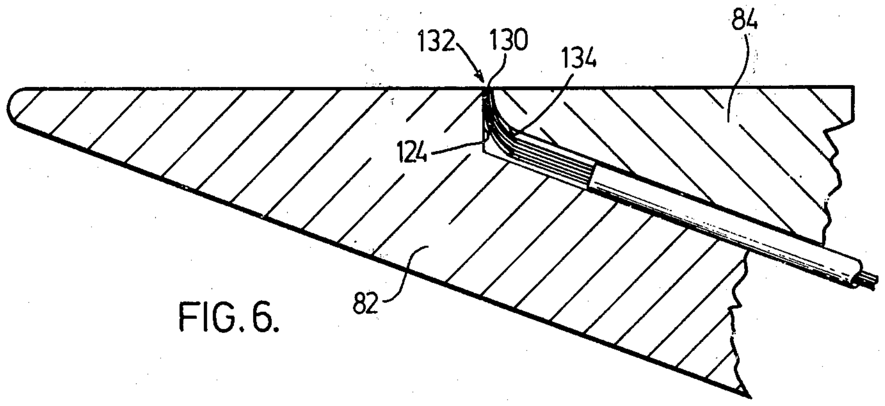
FIG. 6 is a section through the fibre optic bundle end and splitter tongue as it is held in position.

The plate 84 abuts the shoulder 124 of the base portion 82 in the manner shown in FIG. 3 to form a parting line or butt joint 126. This joint can be modified to provide the opening for the bundle end. A preferred approach in providing the opening is to provide a very minuscle recess in the edge 128 of the plate 84. The recess 130, as enlarged in FIG. 5 of the drawings, is rectangular in shape to provide a rectangular-shaped opening for the bundle end 72. With the plate secured in position and the bundle end 72 laying in the tunnel, it is confined to the shape of the recess 130 and curved upwardly to provide the opening for the bundle end designated 132, as shown in FIG. 6. The underside of the plate 84 has an undercut portion 134 beneath the edge 120 of the recess to provice a smooth surface around which the glass fibres of the fibre optic bundle bend in conforming the opening 132. Opposing the rounded portion 134, the shoulder 124 of the base 82 cooperates to confine the fibre optic bundle and pinch it in position.

A preferred manner of handling the fibre optic bundle end in achieving a uniform flush location of the end in the opening 132 of the splitter tongue, is discussed with respect to FIGS. 7, 8 and 9. As shown in FIG. 8, the base 82 has the fibre optic bundle end 72 located in the narrow channel 120 which serves to position the bundle and the bundle is lying against the shoulder 124 in the flared area 122. The bundle is positioned such that its end projects substantially above the surface 136 of the splitter tongue. The bundle is pinched between a pair of tweezers 138, as indicated by arrows 140, to provide a somewhat rectangular-shape for the bundle end, as accommodated by flared portion 122. The plate 84, as it abuts the rear shoulder 127 of the base, is moved downwardly in the direction of arrow 142, where the undercut portion 134 of the recess opening 130 gradually bends the bundle to move it into the position shown in FIG. 6 and at the same time, confine the bundle within the width of the recess 130. All the time, the tweezers are held in engagement with the bundle. The plate 84 is then secured into position by the use of bolts 104.

For the sake of clarity in FIG. 8, the bundle end 72_a_, as it projects above the surface of the plate 84 and splitter tongue base 82, is shown with single fibre ends projecting upwardly. A clear epoxy or other type of cement or adhesive is applied to the opening 132 to fill in the gaps around the fibres as they are located in the opening defined in the joint 126. After the adhesive has set, the portion of the fibres which extends above the splitter tongue is severed and the surface abraded to provide a smooth surface which is flush with the splitter tongue. Therefore, the bundle end 72 in confined within the boundaries of the recessed edge 130 of plate 84, as shown in FIG. 9. The adhesive holds the bundle ends in position so that vibration or the like will not disturb their positioning in the opening 132. In this manner, a precise, easily assembled accurate arrangement for the bundle is formed. As can be appreciated, the recess along the joint 126 of the plate and base may be provided in various manners to determine a desired shape for the bundle, such as a circular, oblong, diamond, or any other desired shape to suit the particular needs in detecting various types of labels. It is also appreciated that the recess to form the opening in the joint may be provided in other ways, such as partly in base and plate or wholly in the base.

The size of the opening for the fibre optic bundle is, therefore, very small compared to the overall label size to be detected. For example, in sensing a fibre optic bundle of fibre diameters of approximately 0.002 inches, the opening 132 may be of a length of approximately 100 thousands of an inch and a width of approximately between 5 to 10 thousands of an inch. There may, therefore, be up to approximately 200 fibres in the opening. This size of opening for the detector substantially increases the sensitivity and accuracy in detecting the leading edge of a label. The distance the leading edge of the label has to travel, in moving from zero cover-up to 100% cover-up of the opening width, is merely between for example 5 to perhaps 10 thousands of an inch. It has been found that the unexpected, highly accurate sensing of a leading edge of a label can now be achieved. As the leading edge of the label begins to cover-up a portion of the opening the beam intensity to the receiver decreases. The output of the receiver is dependent upon the decrease in beam intensity, so that the receiver output can be monitored in a manner such that, for even a movement of perhaps 2 thousands of an inch of a leading edge of a label over the opening, causes the module to transmit a signal to the controller to indicate its precise position on the ramp. According to a preferred embodiment, the module may be set to generate a signal when the leading portion of the label covers approximately one-half of the width of the opening 132, therefore, indicating the precise position of the leading edge of the label, so that the controller may now, depending upon the label requirements, either immediately stop movement of the label or continue its movements to a position such as label 12*c*, shown in FIG. 2. It can, therefore, be appreciated that in the use of a fibre optic bundle and the shaping of the opening in the manner defined provides a very precise form of label sensing, which may have a variation well within the limits of 1 or 2 thousands of an inch. This type of preciseness in label sensing is expected to meet most known requirements in labelling operations.

The use of the fibre optic bundle also provides the opportunity of defining an opening to receive the beam from the emitter over a width which may be substantially less than the sensitivity field width of commercially available label sensor/receivers. Also the fibre optic bundle, as explained, permits the positioning of one of the components of the label sensor remotely of the splitter tongue free end, thereby maintaining the compactness of the splitter tongue arrangement and also permitting the detection in an absolute manner of the leading edge of the label which is next to be separated from the web.

It is appreciated that visible light may be the electromagnetic radiation used in the detector, or other forms of electromagnetic radiation may be used, such as ultraviolet.

It should also be appreciated that the positioning of the label detector, emitter and receiver may be reversed from that of the preferred embodiment, in that the receiver may be positioned above the fibre optic bundle and, in turn, the fibre optic bundle transmitting the beam from the emitter upwardly to the receiver.

According to the preferred manner of positioning the fibre optic bundle in the splitter tongue, this provides an economical, precise form of defining the shape of the fibre optic bundle end to serve various purposes in label detection. It is economical to manufacture and easy to set up. The plate 84 may be removed when needed for servicing of the component and fresh adhesive applied, if needed, or due to breakage of the ends, fresh fibres may be extended beyond the splitter tongue upper surface by moving it upwardly along the tunnel so that a new bundle end may be formed with fresh clear adhesive.

Although various preferred embodiments of the invention have been described in detail, it will be understood by those skilled in the art that variations may be made to them without departing from the spirit of the invention of the scope of the appended claims.

The embodiments of the invention in which an exclusive property or privilege is claimed are defined as follows:

1. In apparatus for separating spaced-apart labels from a carrier, a ramp having a tongue portion about which such carrier travels to separate labels from carrier, a fibre optic bundle having a first end positioned in an opening defined in the ramp surface near the tongue and its second end remote from said tongue, said ramp having a parting line between two ramp components, said parting line being near said tongue portion, one of said components being removable from said ramp, the parting line having a recessed area to define said opening for and confine said first bundle end, a label sensor comprising an emitter unit and receiver unit, one of said units spaced from and directed at said first bundle end and the other unit, positioned in said ramp and directed at the remote bundle end, such carrier with labels travelling over said first bundle end whereby a predetermined detected decrease in emitter beam intensity received by said receiver indicates a label.

2. In apparatus of claim 1, said parting line extending the width of said ramp and parallel to said tongue free end, the removable component having a rectangular recess provided in its parting line edge to define a rectangular-shaped opening for said first bundle end.

3. In apparatus of claim 1, the ramp components having a tunnel defined therebetween to receive said fibre optic bundle, said tunnel leading to said opening for said first bundle end.

4. In apparatus of claim 1, said channel being flared outwardly beneath said opening and to at least the opening width.

5. In apparatus of claim 1, said removable component being a plate, the parting line edge of such plate having a recess therein to define a rectangular opening along said parting line, said plate being removably securable to said ramp.

6. A label sensor adapted for use with a labeller which separates spaced-apart labels from a translucent carrier by passing such carrier around the free end of a tapered member, said sensor device comprising an emitter unit, a receiver unit and a fibre optic bundle for transmitting to said receiver, the sensor being adapted to sense a label which is next to have at least its leading portion separated from such carrier, an end of said fibre optic bundle being positioned in an opening of said tapered member near its free end, said emitter unit being spaced-apart from and directed onto said first bundle end where the carrier with labels travels between said bundle end and emitter, said tapered member comprising a base with a removable plate secured to said base, said base defining said tapered member free end, rearwardly of said free end an edge of said plate abuts a corresponding shoulder in said base, the abutting joint between plate and base has a recess to define said opening which receives said bundle end and which clamps the bundle in a shape determined by said recess, said fibre optic bundle transmitting the beam from said emitter rearwardly of the free end of said tapered member to said received unit, the lowest level of beam intensity transmitted indicating the presence of a label.

7. A label sensor device of claim 6, wherein the plate edge has a recess which, when the plate is secured to said base, defines a rectangular-shaped opening for said bundle end.

8. A label sensor device of claim 6, wherein said plate is undercut beneath its surface along the width of said recess.

9. A label sensor device of claim 6, wherein a tunnel is defined within said base and plate which leads to said opening defined between base shoulder and plate edge, said receiver being located at the other end of said tunnel where said fibre optic bundle transmits received beam intensity to said receiver.

10. A label sensor device of claim 6, wherein the width of the rectangular-shaped opening is approximately 5 to 10 thousands of an inch.

11. A compact splitter tongue with label sensor for use with a labeller which separates spaced-apart labels from a web by passing such web around said splitter tongue and applies such separated labels to articles, said label sensor being adapted to detect the leading portion of a label which is to be separated from said web, said label sensor comprising an emitter and a receiver, said splitter tongue having an aperture defined therein adjacent its free end to receive an end of a fibre option bundle, a cantilever mounted support ramp extends outwardly from framework which carries a web drive for moving such web around said splitter tongue, a base secured to said support ramp defines outwardly of said ramp the free end of said splitter tongue, a removable insert secured in a recess in said base to define a planar surface from ramp to splitter tongue free end, the foremost joint between insert and base defining said aperture to receive and secure an end of said bundle in position, said fibre optic bundle located in said splitter tongue transmitting beam intensity received from said emitter which is spaced from and beamed on said bundle end to said receiver which, due to its relative bulky size, is located remote from the free end of said splitter tongue, said web travels over said apertures where said web passes a detectable level of beam intensity.

12. An apparatus for applying labels to continuously conveyed articles, a labeller adapted to use a supply of spaced-apart labels carried on a web, each such label having a pressure-sensitive adhesive on its back which is releasably affixed to such web, a splitter tongue with label sensor for sensing the leading edge of the spaced-apart labels on the web, the web being trained to travel around the free end of the splitter tongue to effect a label separation from web, the label sensor being adapted to detect the leading portion of the label which is next to be separated from the web, the label sensor comprising components which cause a signal when the combination of web and label is between such components, a fibre optic bundle is located in the splitter tongue with an end positioned in an aperture defined in the upper surface of the splitter tongue over which the web travels, one of the sensor components being located above and directed onto the budnle end, the other component, being remote from the free end of the splitter tongue and being operatively associated with the other component via the fibre optic bundle, said fibre optic bundle transmitting a beam between the sensor components through an arc as determined by the surface over which the web travels being at an angle relative to the axis of the field which the component in the splitter tongue is capable of receiving or sending, a signal being generated by the components when at least the leading portion of lable and web overlies at least a minor portion of the fibre optic bundle end to indicate presence of label leading edge.

13. An apparatus of claim 12, wherein said splitter tongue comprises separable components which abut one another in a manner to define said aperture whereby said bundle end is pinched between the components as they are secured together.

14. An apparatus of claim 13, wherein said aperture is rectangular of a length of approximately 100 thousands of an inch and a width of approximately 5 to 10 thousands of an inch.

* * * * *